Dec. 28, 1965   M. FRIEDMAN   3,225,671
CONTAINING DEVICE FOR A PHOTOGRAPHIC FILM ASSEMBLY
Filed Dec. 28, 1962   3 Sheets-Sheet 1
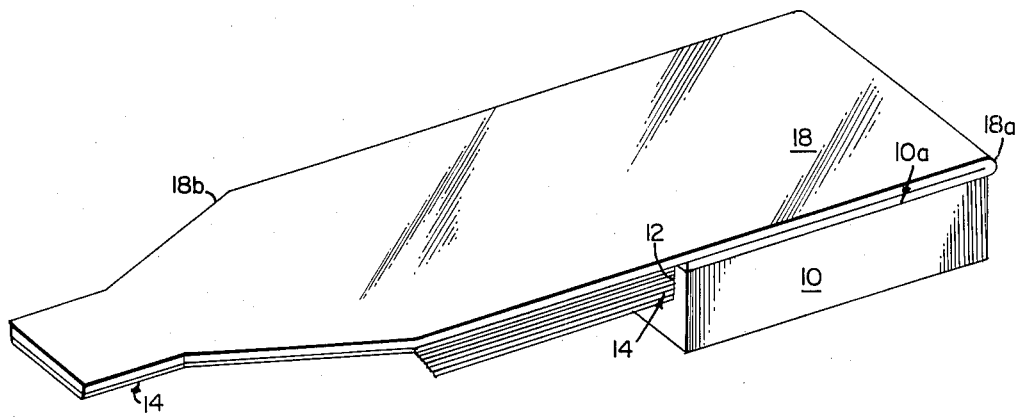
FIG.1
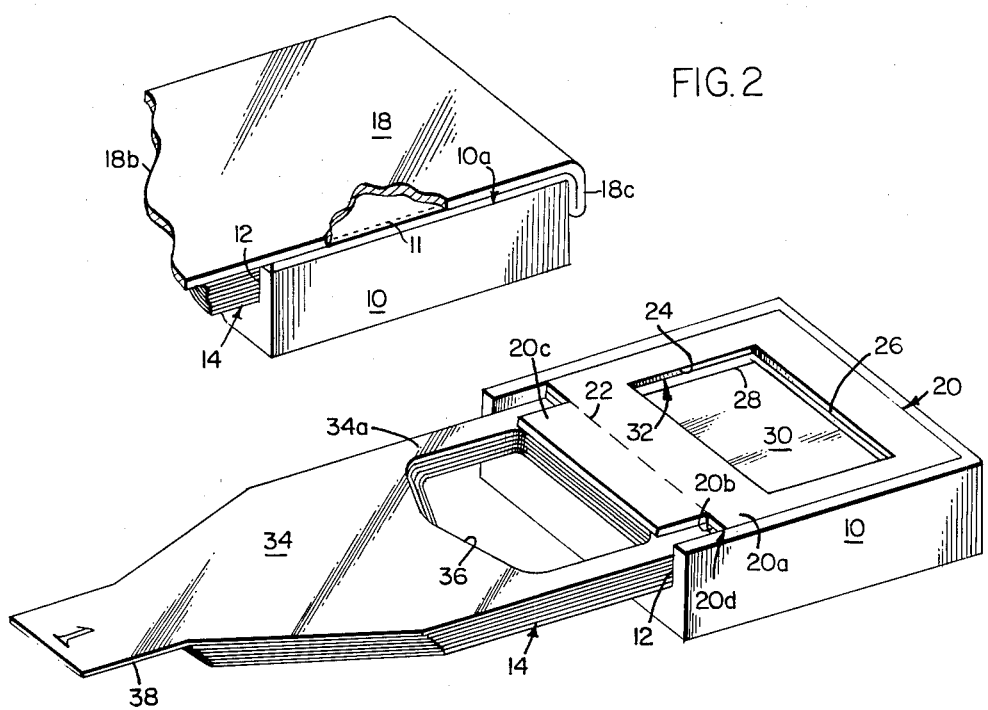
FIG.2
FIG.3
INVENTOR.
Melvin Friedman
BY Brown and Mikulka
ATTORNEYS Dec. 28, 1965      M. FRIEDMAN      3,225,671
CONTAINING DEVICE FOR A PHOTOGRAPHIC FILM ASSEMBLY
Filed Dec. 28, 1962                                      3 Sheets-Sheet 2

INVENTOR.
Melvin Friedman
BY
Brown and Mikulka
ATTORNEYS

Dec. 28, 1965    M. FRIEDMAN    3,225,671
CONTAINING DEVICE FOR A PHOTOGRAPHIC FILM ASSEMBLY
Filed Dec. 28, 1962    3 Sheets-Sheet 3

INVENTOR.
Melvin Friedman
BY
Brown and Mikulka
ATTORNEYS

United States Patent Office 3,225,671
Patented Dec. 28, 1965

3,225,671
CONTAINING DEVICE FOR A PHOTOGRAPHIC
FILM ASSEMBLY
Melvin Friedman, Watertown, Mass., assignor to Polaroid Corporation, Cambridge, Mass., a corporation of Delaware
Filed Dec. 28, 1962, Ser. No. 248,094
18 Claims. (Cl. 95—13)

This invention relates to a containing device for holding and successively supplying a plurality of individual photographic film units in a camera. The invention particularly relates to a containing device incorporating novel means for retaining the film units therewithin prior to its being mounted in the camera and for automatically effecting their release or ejection as an accompaniment or consequence of mounting it in the camera.

The device of the present invention, which will be termed a container herein in the interest of brevity and which may also be considered as falling within the scope of a magazine, is especially adapted to accommodate film units of a miniature type comprising a processing liquid and a rigid mount suitable for insertion in a conventional slide projector. Thus, immediately after their exposure and processing in a so-called self-developing or self-processing camera, they are in a form ready for projection. Film units and a camera of the character described are more completely disclosed in the copending U.S. applications, Serial Nos. 248,092 and 248,093, filed concurrently herewith. The container of the invention, when loaded with film units of the category above described, may be termed a special form of film pack, which is also deemed to fall within the scope of the present invention.

In accordance with the foregoing considerations, a principal object of the present invention is to provide a container for so holding and supplying a plurality of film units that they may be positively held in the container prior to its insertion in a camera, and automatically released for successive exposure and processing when it is mounted in the camera.

Other objects are to provide a container of the character described which is compact and light-tight; which permits loading of photosensitive film units in the camera in daylight; and which is particularly adapted to accommodate film units of a miniature format comprising a processing liquid and adapted to a rapid diffusion transfer process for producing a positive print.

Further objects are to provide a container which is particularly suitable for holding and supplying film units of the character described in the form of fully mounted transparencies adapted, when removed from a self-developing type of camera, to immediate projection in a conventional slide projector; and to provide a container with film units loaded therein, especially adapted for use therewith, in the form of a film pack.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a diagrammatic perspective view of the container of the invention loaded with film units, as they would appear prior to being inserted in the camera;

FIG. 2 is a diagrammatic, perspective, fragmentary view of a modification of the container of FIGURE 1;

FIG. 3 is a diagrammatic perspective view of the container and film units approximately as they would appear when loaded in the camera;

Figure 4:
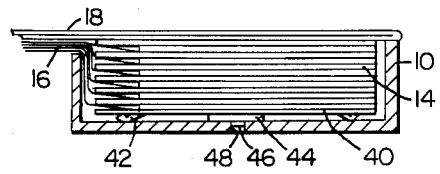
FIG. 4 is a diagrammatic side view of the loaded container.

Referring now to FIGURE 1, a container 10, having an aperture 12, fully loaded with film units 14 of the type hereinbefore mentioned, is illustrated as it would appear prior to its placement in the camera. The container 10 is preferably formed of a thermosetting or thermoplastic material as, for example, a polystyrene. The exit aperture or slot 12 permits lateral withdrawal of the film units from the container. An opaque cover sheet 18, such as a sheet of light-absorbing paper having an adequate tear resistance, is releasably fastened to the edges 10a at the front or open face of the container so as to form a front wall thereof, as by a pressure-sensitive or other appropriate adhesive. The terms "front" and "rear" or "forwardly" and "rearwardly," as used herein, refer, respectively, to proximity to or remoteness from the front of a camera, which would exist when the film container is mounted in the camera. Sheet 18 is folded back, on itself, at 18a and includes a leader portion 18b adapted to extend through an exit port of the camera. Alternatively, the cover sheet 18 may be folded over one or more edges of the container, as shown at 18c of FIG. 2, and be releasably attached to a side or sides of the latter to obtain an additional purchase and bonding surface. The cover sheet 18 is stripped or peeled from the container after loading of the latter in the camera by manually pulling on the leader portion 18b, said portion being positioned, during the aforesaid loading operation, so as to extend through the exit port of the camera. Other materials, such as a plastic or a thin metal sheet or foil, may be used for forming the cover sheet 18. Alternate methods for releasably attaching the cover sheet to the container 10 contemplate the provision of a hermetical seal or a cover material having weakened linear areas such as serrations or partial perforations 11 along marginal portions which yield under stress and facilitate its removal. As shown, when the cover sheet 18, which provides both a retaining and light-shielding function and serves in a protective capacity, is removed, the front of the container 10 is completely open. In a modification, however, its functions are limited to those of a light shield and a closure against entrance of dust and the like. In the latter instance, the container 10 may include front marginal or framing portions serving in a film unit retaining capacity.

Figure 6:
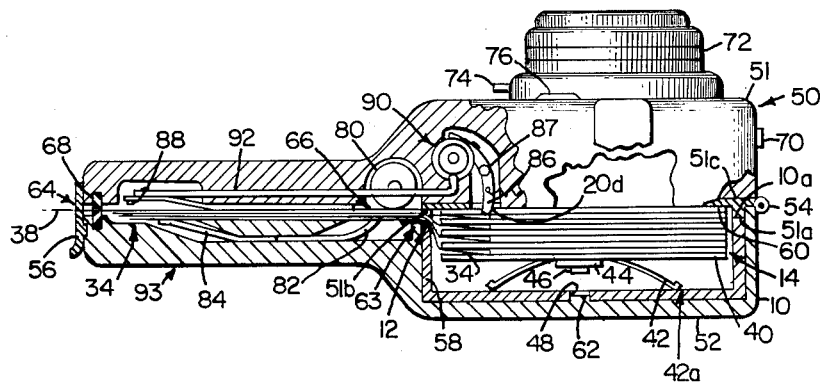
FIG. 6 is a diagrammatic side view of a camera adapted to accommodate the container and to photographically expose and process film units loaded therein.

In FIG. 3 the container 10 and film units 14 are shown approximately as they would appear with the cover sheet 18 removed, it being assumed that they are now positioned in the camera and held within the container by structure of the camera which establishes the focal plane thereof. Actually, the foremost unit would be located above, or forwardly of, the side walls of the container when the cover sheet 18 is completely removed, as shown in FIG. 6. The film unit 14, as shown in detail in FIG.

7, comprises a flat, substantially rigid, frame-like mount 20 composed, for example, of an essentially waterproof cardboard, a plastic, or other suitable material and including a front section 20a and a rear section 20b. A spacer element 21, shown in FIG. 7 and composed of a thin cardboard or the like, is positioned between the front and rear sections along three sides, exclusive of that of a flap or leaf portion 20c which is actually an extension of one side of the front section 20a. The front and rear sections are coated on their inner or facing surfaces with a heat-sealing adhesive such as a polyethylene and are bonded to opposite surfaces of the spacer 21 thus effecting an integral condition of the front and rear sections. The front and rear sections terminate similarly along their sides, exclusive of that of flap 20c, and are aligned to form two short, firm leading edge portions 20d which are used as essentially unyielding contact means, in conjunction with means of the camera, to control advancement of a film unit therewithin, as described below. The flap 20c is adapted to be folded over or pivoted 180° against the front section 20a along the semi-perforations 22 as a final step after a positive image, e.g., a transparency has been formed in the film unit. The front section has a rectangular exposure aperture 24 formed therein, within the inner margins of which is a thin opaque masking element 26 constituting a second or inner enclosing frame forming a second slightly smaller aperture 28 within the aperture 24. The element 26 is composed, for example, of a metallic sheet material such as aluminum, or a metallized plastic such as polyethylene terephthalate sold by E. I. du Pont de Nemours & Co., Wilmington, Delaware, U.S.A. under the trade name of Mylar. Masking element 26 is bonded in part to the rear surface of front section 20a, its edges being adjacent to or abutting those of the spacer 21, and contributes to a sharply outlined picture area, as will be explained below. If the mount 20 is composed of a plastic material it could be formed as a single piece of proper contours, eliminating the separate front and rear sections and spacer.

The rectangular aperture 28 may, for example, be considered as having the dimensions of the conventionally exposable area of a 24 x 35 mm. film, or it may have the dimensions of another film material such as one customarily associated with a miniature camera. Assuming the 24 x 35 mm. miniature format of film, the short or 24 mm. dimension of the aperture is parallel to the direction of withdrawal of a film unit from the container 10. While this is, perhaps, a preferred arrangement in view of a contemplated camera design shown in FIG. 6 which would permit the camera to be held vertically for a horizontal exposure, it is not essential. Thus, the long dimension of aperture 28 could be parallel to the aforesaid direction of withdrawal, if desired, in which case the camera could be held horizontally to obtain a horizontal picture. If the film is of a type having a square image area, the camera could, of course, be held in either position for a similar result.

A film material 30, similar in width to the transverse dimensions of mask 26 so as to abut the inside edges of the spacer 21 and comprising one or more photosensitive layers, is adapted to have an image formed therein by a diffusion transfer method of the character previously described. The film 30 is mounted adjacent to the front section 20a as, for example, by having its edges inserted in non-bonded marginal areas existing between the areas 20a and 20b of the front and rear sections of the mount which are not occupied by the spacer 21. The film is attached along a narrow band of the aforementioned heat sealing adhesive to the front section 20a and is exposable through the aperture 28, the visible surface of the film component 30, as seen in FIG. 3, being the transparent film base or support through which a rearwardly lying silver halide emulsion of the unit is exposed. The relative thicknesses of the spacer (e.g., .009″), mask (e.g., .0025″) and film (e.g., .006″) are so chosen as to permit the film freedom of movement excepting along the aforesaid bonding band or strip to substantially prevent any unwanted restraint which might result in buckling during projection.

Figure 8:
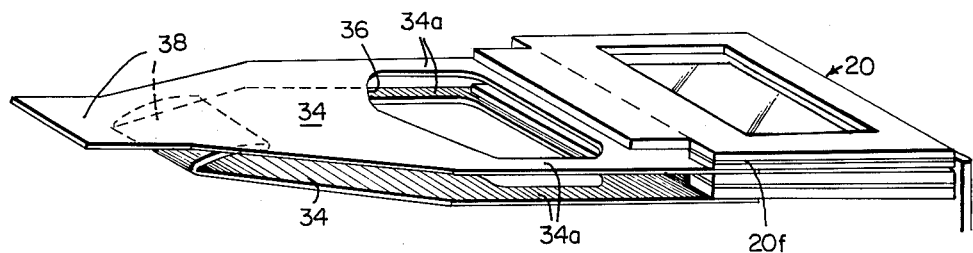
FIG. 8 is a further diagrammatic perspective view of film units as they would appear with the container mounted in the camera.
Figure 9:
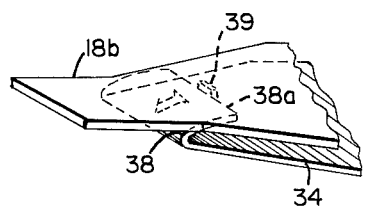
FIG. 9 is a diagrammatic fragmentary view of cover sheet means for engaging a foremost film unit carried by the container.

Each film unit 14 also includes a separable leader 34, attached to the rear section 20b of mount 20, suitably composed of an opaque paper with an aperture 36 formed therein, the purpose of which will be described hereinafter, and a draw tab 38 at its extremity for manually advancing the film unit from exposure position adjacent to the open front of the container 10 to the processing stage and, thence, to a location exteriorly of the camera. The material of the leader 34 and draw tab 38 is preferably somewhat resilient so that the draw tab will possess a certain functional elasticity when folded over, as shown in FIG. 8, for a reason to be described.

The tab 38 of the front or foremost film unit extends through the aperture 12 of the container, across a processing chamber of the camera, and through an exit aperture of the camera, where it can be grasped manually. A number, such as the number "1" shown in the illustration, is printed on the tab to indicate which film unit is positioned for exposure and, assuming a known complement of the film unit container 10, to advise the operator how many film units remain therein for further exposure purposes. The position of the number "1" tab, as shown, is achieved either by reason of the tab's being thus extended when supplied, as illustrated in FIGURE 1, or, alternatively, through the instrumentality of its being folded over but with its tip lightly and separately bonded or otherwise releasably attached to the under or rear side of the container cover sheet 18, as by means such as a small lug, ear or other attaching means 39 projecting from the rear surface of the cover sheet portion 18b for engaging the folded-over edge 38a of the tab 38, so that removal of the latter pulls the tab to the extended position.

Figure 5:
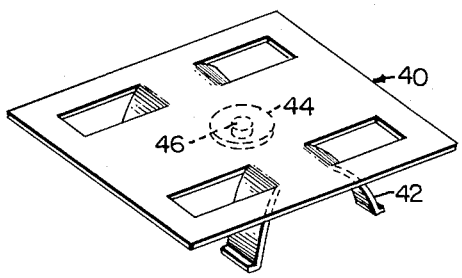
FIG. 5 is a diagrammatic perspective view of the pressure plate assembly of the container.

The film containing device and its components are shown in greater detail in FIGS. 4, 5 and 6. It comprises a pressure plate 40 including a compression spring 42 for urging the contained film units 14 forwardly so as to place the foremost unit at the focal plane of the camera. The compression spring 42, in the example, is composed of cut-out portions of the pressure plate itself, the material thereof being a resilient metal or a plastic, e.g., a Phosphor bronze or a thermoplastic resin of the acetal family, respectively. On the rear side of the pressure plate 40 is a spacer element in the form of a disk 44, having a rearwardly-disposed proturberance such as a ball or plug 46, which extends part way into and is frictionally or compressively held by an aperture such as the socket 48 formed in the rear wall of the container. When the container 10 is initially supplied to a purchaser, namely, with a full quota of film units 14 contained therein, the plug 46 is held frictionally in the socket 48, against the bias of spring 42, in a manner akin to that of a snap fastener. This condition of the male and female elements 46 and 48 is that shown in FIG. 4 and one which may be assumed as also existing in FIGS. 1 and 2. The fit of these elements is both light- and dust-proof. Retention of the pressure plate 40 at the rear of the container by the snap fastener elements 46 and 48 permits the use of a relatively lightweight, moderately tear-resistant material for cover sheet 18 because, until the pressure plate is released, there is no tendency to force it away from the container surfaces 10a. In one modification of the fastener means shown, a plurality of fastener elements of the character described is employed. In another modification portions thereof are located at the tips 42a of the elements forming the spring 42 so as to extend through a plurality of perforations formed in the container 10. Also, as will be apparent, the male and female elements 46 and 48 can be reversed as to location and function in a generally similar manner. A further modification contemplates the use of detent means such as a movable spring-loaded component identified with one of the pressure plate and fixed portions of the container, for example, a container wall, and a cooperating component, e.g., means providing a recess for accepting the movable element identified with the other of said elements.

As previously stated, the film units 14 and container 10 are primarily adapted to be used in a so-called self-developing or self-processing camera, but of a miniature type as opposed to one of presently conventional proportions for this category of camera. Their structure and function therefore become more meaningful when considered in direct relation to such a miniature camera. This relationship is clearly shown in FIG. 6 wherein the container and film units are shown with respect to a camera 50 of the character described. The camera includes front and rear casing sections 51 and 52, pivotally connected at 54 and releasably held at closed position by a latch 56. When the sections 51 and 52 are swung to open position the container 10 is mounted in an exposure chamber 58 formed in the rear casing section 52 of the camera. The film units are urged toward a focal plane 60 of the camera by the pressure plate 40 and associated compression spring 42, the foremost film unit being held flat at the focal plane and adapted, after its exposure, to withdrawal laterally from in front of the container, endwise, across the slot 12. Where, as previously mentioned, the container includes a frontal flange or frame holding the film units against egress from the front, each film unit would be withdrawn through rather than across the modified slot 12. The pressure plate, focal plane framing means and film structure are such that pressure is applied only to the rigid mount portions 20 of the film units, the film component 30 and liquid container 98 lying in recessed areas so as not to be contacted directly and thus substantially avoid the reception of any compressive force.

When the front and rear camera sections 51 and 52 are closed and latched, the rearwardly-extending portions 51a and 51b of the front section, adjacent to the apertured frame-like portion 51c which establishes the aforesaid focal plane 60 and defines the area of the film which is subject to exposure, bear against the forward edges 10a of the container thus forcing it rearwardly against the rear wall of the exposure chamber 58. The aforesaid operations automatically cause a small pin or boss 62, projecting forwardly from the rear surface of chamber 58 and which, in light contact with ball 46 of the pressure plate 40, has held the container slightly spaced from the rear wall, to enter the aperture 48 of the container and force the ball 46 forwardly out of the aperture. This permits the compression spring 42 of the pressure plate to assume control and urge the film units forwardly toward the focal plane, as shown in FIG. 6. The leader 34 is so positioned as to extend through the container exit aperture 12, and through an aperture 63 leading into a second or processing chamber 66. The draw tab 38 of the foremost film unit passes between resilient light sealing means 68 and projects from the camera through the exit aperture 64, where it may be grasped, manually, for advancing, through the medium of the leader 34, the foremost film unit comprising the film 30 and mount 20 into the processing chamber and thence from the camera through the exit 64. It is, of course, to be assumed that the opaque cover sheet 18 has been stripped from the container, as previously described, immediately after loading the container in the camera and prior to making the first exposure.

Other more or less conventional elements of a camera suitable for use with the container and film units of the present invention include a shutter release button 70, a lens and diaphragm mounting and adjusting means 72, a focus adjusting means 74, finder means 76, and a photocell 78 for providing some measure of automatic light control. Additional camera elements, more particularly cooperating, from a functional viewpoint, with the novel structural features of the film unit, include rotatable and fixed pressure-applying members 80 and 82, a flat spring-like member 84 which exerts a slight pressure against the rearmost of a plurality of the film unit leaders 34 as positioned in the processing chamber 66, detent means 86 and 88 engageable with the edge portions 20d of the film unit at different stages of its advancement, and interlock means 90 and 92 associated with the aforesaid detent means 86 and 88. The camera housing sections 51 and 52 are so contoured in portions enclosing the processing chamber 66 as to constitute a so-called pistol grip 93 for most conveniently holding the camera during picture taking.

Figure 7:
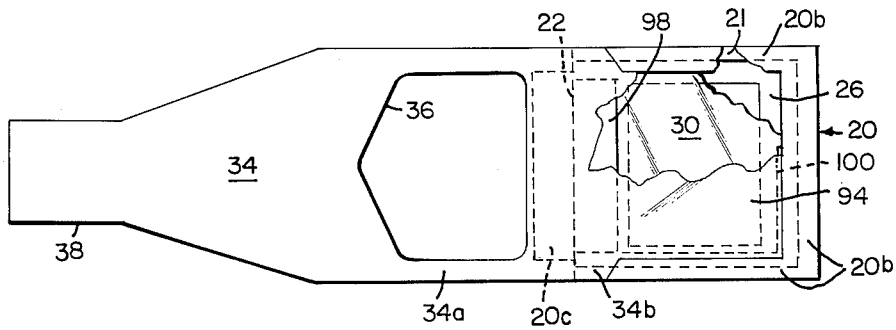
FIG. 7 is a diagrammatic rear view of the film unit of the invention with special reference to the slide mount, liquid container, leader, and surfaces against which the pressure plate bears.

Further referring to the film unit, especially as shown from the rear in FIG. 7, the leader 34 is attached at 34b to marginal areas of the rear section 20b of the film mount by a manually-separable adhesive means such, for example, as a pressure-sensitive, heat-resistant adhesive of the type of a very firm synthetic rubber resin adhesive. Such an adhesive may, conveniently, be provided in the form of a double-faced tape.

An opaque cover sheet 94 is superimposed with the rear or emulsion surface of the film material 30 in the area bounded by the side members 20b of the rear section. As shown in FIG. 7, the cover sheet 94 is unitary with, that is, it is an extension of, the leader 34 but it may be an individual element attached to the flap 20c by a band of the aforesaid adhesive applied transversely to the rear surface of the flap. In the latter instance, the leader 34 may be independently attached to mount 20, e.g., along opposite sides 20b. On the other hand, if the container 10 and film units 14 are used with a camera of a so-called "programmed" or "programming" type wherein each film unit is advanced and fully controlled by mechanism of the camera, the leader may be dispensed with entirely. The cover sheet 94 serves as a shield to prevent light from passing completely through a given film unit to the film unit which succeeds it in the container 10 thus preventing unwanted exposure of the succeeding film units therewithin when the foremost film unit is exposed. It likewise acts as a barrier sheet during the release and spreading of the processing liquid which occur between it and an adjacent silver halide emulsion or other layer of the film. In either of the above-described constructions the cover sheet 94 is attached, either individually or as a part of leader 34, to the mount 20. Additionally, it could be attached to marginal portions of the film 30, preferably outside of the area to be exposed. After the processing operation, the cover sheet and waste portions of the film unit, e.g., the negative, are to be stripped away from the remainder comprising the mounted positive. A container or pod 98, releasably holding a processing liquid, is attached to the inner or forward surface of the cover sheet 94 so as to overlap one edge of the film 30. When subjected to compression, the container is rupturable along those of its sealed edges or other given separable portions which are located adjacent to the film 30. A container of the nature contemplated may, appropriately, be composed of a liquid impervious sheet material or materials and be of a type such as described in detail in U.S. Patents Nos. 2,543,181 or 2,968,554. When, after its exposure, the front film unit is drawn progressively between the pressure-applying means 80 and 82 of the camera by manually pulling on the tab 38, the processing liquid is released from the container and spread over the adjacent surface of the film component 30, the liquid being imbibed into the film and functioning, in a diffusion transfer process, in a manner dependent on the nature of the processing liquid and the particular structure of the film, that is, depending upon whether the film is of a black-and-white type or a certain category of color film.

The spacing between the transversely located portions 20b of the mount, as may especially be noted in FIG. 7, is such as to permit the pressure-applying means 80 and 82 to bear most effectively on the structure lying between said portions, namely, through the instrumentality of the thin flexible cover sheet 94, on the underlying liquid container 98 and film 30 so as to efficiently rupture the container and spread the released liquid. The extended flap 20c permits the pressure-applying means 80 and 82 to bear on opposite sides of the front section, only, until reaching the container 98 and film 30, thus placing the least possible thickness of the mount between the compressive means prior to applying compression progressively to the film component 30. The structure, entailing flap 20c, permits an essentially direct compression of the container 98 and enables the use of a wider container between the mount portions 20b. The inwardly folded-over marginal portions 100 of the cover sheet 94 constitute additional barrier or trapping elements to hold the processing liquid confined between the cover sheet and the film 30 thus contributing to the spreading of an even and complete layer of the liquid and preventing escape of any portion thereof from the film assembly into the camera mechanism. Also, because the cover sheet 94, being composed of a paper or other material, has a certain resiliency, the folded portions 100 are adapted to contact the film component 30 firmly, in response to the forward bias applied by spring 42 to pressure plate 40 of the container 10, and to serve in a light-shielding capacity. The masking means 26 enables the application of compression during the liquid spreading operation to areas beyond the limits of the actual image area thus insuring spreading of the processing liquid at least throughout said image area.

During withdrawal of the foremost film unit from the container 10 and from the exposure chamber 58, the detent means 86 is brought into contact with the edge surfaces 20d, and is caused to pivot in a clockwise direction around the bearing 87, as seen in FIG. 6. This causes movement of the interlock means 90 and 92, said means being, respectively, a transversely movable spring-loaded shaft and a multi-angled rod, to the latter of which torque is applied through thrust of the shaft 90, such that the detent means 88 is permitted to move rearwardly so as to contact the leader 34 and, thereafter, to contact the edge surfaces 20d of the film unit when the latter is drawn to a location contiguous therewith. The detent means 88, in contacting the surfaces 20d, acts as a limit stop to hold the film unit in the processing chamber 66 until the detent means is manually released. It may be retained in the processing chamber for the given brief period determined as suitable for a specified type of film emulsion for completing the processing step. Each of the detent means 86 and 88 preferably comprises a pair of detent elements of the type shown which are spaced apart transversely and adapted to contact the edges 20d located at both sides of the flap 20c, the two contacting edges 20d being provided to avoid any possible twisting of the mount due to restraint being exerted at one side only. Assuming processing to have been performed in the chamber 66, the interlock means 90 and 92 are manipulated manually to remove the pair of detents 88 from contact with the edges 20d by actuating means (not shown), namely, by pressing upon an extension of the shaft 90 which projects outwardly through the camera housing. A camera mechanism suitable for performing the foregoing operations is more fully described, as previously mentioned, in the copending U.S. patent application Serial No. 748,093, filed concurrently herewith.

Following the withdrawal of the detents 88, the entire film unit can be removed from the camera through the exit slot 64. After the film unit has thus been removed, the leader 34 and cover sheet 94, with the exhausted liquid container 98 attached to the latter, are stripped from the transparency mount 20 and discarded, one or more layers of the film component adhering to the sheet 94 and being discarded also. After the aforesaid stripping operation there is left the assembly consisting of the transparency and mount. Again referring to the spacing between the transverse portions 20b, this spacing serves not only to permit a most efficient exertion of force by the compressive means, as above described, but allows the ready application of any subsequent treatment of the transparency as may be advisable, e.g., the application of a coating of a stabilizing liquid. The edges of the aforesaid portions 20b serve as guide means to facilitate linear movement of an applicator containing such a liquid. The extended flap 20c provides a clear path in a single plane approaching the aforesaid transparency for moving an applicator so as to contact it throughout its surface most efficiently. Assuming any final treatment of the transparency to have been completed, the flap 20c is then folded over along the semi-perforations 22 and fastened to the underlying portion of the front section 21 by the pressure-sensitive adhesive 96 to produce the finished assembly in a condition suitable for projection.

In FIG. 8 the relation of the foremost and next-succeeding film unit is shown, with the foremost unit assumed to be positioned at the focal plane. The draw tab 38 of the foremost unit will be noted as extending straight ahead in a position which would result in its protruding through the exit slot 64 of the camera, as shown in FIG. 6. The draw tab 38 of the succeeding unit is folded over on itself, however, so as to bear against the rear surface of the leader 34 of the foremost film unit and, as previously stated, may advantageously be composed of a resilient material to facilitate the degree of force by which it thus bears. The folded-over draw tab of the second or succeeding film unit, due to its resilient property and as facilitated by the flat spring member 84 of the camera which bears forwardly against the leaders, has sprung forward into the aperture 36 of the foremost unit. Continued advancement of the foremost film unit will cause the leading liner edge of the flap 20c of the foremost film unit to enter and exert pressure against the fold of the tab 38. This unfolds and straightens the tab so that it lies in the plane of the leader and extends through the exit slot 64, in readiness to be grasped for advancing the second film unit after the foremost film unit has been completely withdrawn from the camera. Thus, to recapitulate, the withdrawal of a given film unit from the camera automatically pulls the tab of the next succeeding film unit out of aperture 64, for use, subsequently, in withdrawing the latter film unit. In the manner, above described, all of the film units are withdrawn from the container 10, following a complete succession of exposures, after which the camera 50 is opened and a new container holding a full complement of the film units 14 inserted in the chamber 58.

Some modification of the film units presented herein is, of course, possible in conjunction with a containing device of the character described. Thus, for example, a connecting strip or leader may be provided between the film units in place of the resilient tab and aperture arrangement shown. Whereas release of the snap fastener elements has been described as automatically performed through closing the front and rear sections of the camera it is to be understood that separately operable means could be provided for the purpose as, for example, a manually operable plunger for contacting and ejecting the element 46.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic film containing device adapted to be mounted in a camera for holding and successively supplying a plurality of photographic film units, each film unit comprising a laterally extending leader, said device comprising a container having a plurality of walls, a pressure plate dimensionally smaller than the internal dimensions of said container so as to be capable, when unopposed, of substantially free movement forwardly and rearwardly in said container, means for biasing said pressure plate forwardly toward the front of said container, fastener means releasably holding said pressure plate, in opposition to the bias of said biasing means, adjacent to a rear wall of said container, said fastener means being accessible to a force applied through contact with cooperating means located externally of said container for effecting a release of said fastener means to permit said movement of said pressure plate forwardly in said container toward a focal plane of said camera, and means forming an elongated aperture in a side wall of said container adjacent to the front thereof for accommodating the leaders of said film units.

2. A photographic film containing device, as defined in claim 1, wherein said biasing means is a compression spring and said fastener means comprises mutually engageable holding elements identified, respectively, with said pressure plate and another element of said container.

3. A photographic film containing device, as defined in claim 1, wherein said fastener means is in the form of means comprising male and female elements together constituting a type of snap fastener.

4. A photographic film containing device, as defined in claim 1, wherein said container comprises an opaque releasably-attached front wall including a leader extending laterally therefrom, said front wall being adapted to removal when said device is mounted in a camera by drawing upon said leader.

5. A photographic film containing device, as defined in claim 4, wherein the leader of said front wall and the leader of a next-succeeding film unit include interconnecting means identified with their mutually facing surfaces whereby drawing upon said front wall leader in a given direction causes the leader of said film unit to be drawn in a similar direction at a given stage of movement of the front wall leader.

6. A photographic film containing device, as defined in claim 4, wherein said front wall is composed of an opaque, flexible sheet material so releasably bonded to said container as to be adapted to be peeled sideways therefrom when said device is mounted in said camera.

7. A photographic film containing device, as defined in claim 6, wherein said sheet material has relatively weakened linear portions formed along its margins which are adapted to be separated for removal of the functionally covering area of said sheet material when said leader is manually drawn upon.

8. A photographic film containing device, as defined in claim 6, wherein said bonded sheet material overlaps the edges and is bonded to at least one side wall of said container.

9. A photographic film containing device, as defined in claim 6, wherein said sheet material is a paper rendered substantially opaque.

10. A photographic film containing device, as defined in claim 6, wherein both said container, exclusive of said front wall, and said spring are composed of plastic materials, the former of an opaque plastic material, and at least the latter of a resilient plastic material.

11. A photographic film containing device, as defined in claim 6, wherein the front of said container is completely open, permitting the unrestricted forward movement of said film units, when said front wall is removed.

12. A photographic film containing device as defined in claim 6, wherein said sheet material is of a double thickness and is composed of a first section attached to said container, and a second section which is an extension of said first section, folded back over the latter, said leader being an extension of said second section.

13. A photographic film containing device adapted to be mounted in the chamber of a self-processing camera for holding and individually supplying a plurality of film units, each of which units comprises a rigid frame-like mount, a laterally-extending leader, a photosensitive film component and a contained processing liquid, said device comprising a rectangular container having a plurality of walls and an open front, an opaque manually-strippable, laterally removable cover sheet on said open front, a slot formed in one side of said container and extending rearwardly from said open front for accommodating said leaders and for facilitating a generally sideways slidable removal of each successive film unit relative to said open front by means of its associated leader, a forwardly-slidable rectangular pressure plate in said container in contact with the rearmost of said film units, compression spring means adapted to urge said pressure plate forwardly so as to carry said film units forwardly toward the focal plane of said camera, and fastener means releasably holding said pressure plate adjacent to a rear wall of said container in opposition to said spring means, said pressure plate being so dimensioned with respect to said film units as to contact said rigid mount of each but substantially avoid contact with said film component and with means containing said processing liquid.

14. For use in a camera which includes processing means for effecting a diffusion transfer method of forming an image, a film pack comprising a plurality of photographic film units mounted in a container which is adapted to supply said film units individually for exposure and processing, each of said film units comprising a substantially rigid frame-like mount suitable as a slide mount for projection of said image and having an opening formed therein for exposure and viewing purposes, a manually separable leader extending laterally from said mount, a film component including image-receiving surface means and a photosensitive silver halide emulsion so mounted as to cover at least the area of said opening, container means releasably carrying a processing liquid positioned in said film unit adjacent to said emulsion, an opaque cover sheet releasably attached to said mount and superimposed with both said film component and at least that portion of said liquid container through which said processing liquid is released, said cover sheet serving as a light shield for restricting light to the foremost of said film units in said container when a photographic exposure is performed and constituting a barrier against escape of said processing liquid when said film units are subjected to processing, said container comprising a plurality of walls having an open front covered by a manually separable wall comprising a leader which is adapted to removal when said container is mounted in said camera so as to permit, when removed, release of each film unit to the focal plane of said camera and photographic exposure thereof, a slot formed in a side wall of said container having a width and depth for accommodating the leaders of a full complement of said film units in said container and adapted to a generally lateral slidable movement of each successive film unit across said open front under tension applied to its associated leader, a forwardly and rearwardly slidably-movable pressure plate, spring means for biasing said pressure plate forwardly, releasable fastener means identified with said pressure plate and said container, said fastener means being adapted to hold said pressure plate fixed against movement until said container is mounted in said camera, release of said fastener means being effected through contact thereof with means of said camera therewith permitting said pressure plate to move forwardly to bear against and urge said film units toward said focal plane.

15. A film pack, as defined in claim 14, wherein said fastener means is a form of a snap fastener having male and female portions identified with said pressure plate and a rear wall of said container, respectively.

16. A film pack, as defined in claim 14, wherein the leader of said manually separable wall and the leader of a first of said film units have mutually connecting means whereby withdrawal of the first-named leader provides, at a given stage of withdrawal, a partial withdrawal of the second-named leader.

17. A film pack as defined in claim 15, wherein said camera includes pivotally mounted front and rear sections and release of said snap fastener elements is effected automatically when said sections are pivoted to closed relation through contact of portions of said camera with said container, thus repositioning the latter to effect said contact of said means of the camera with said fastener means.

18. In combination with a camera which includes an actuating pin member projecting inwardly in a chamber thereof, a photographic film containing device adapted to be mounted in said chamber for holding and individually ejecting a plurality of film units, said device comprising a container having a plurality of walls, a pressure plate dimensionally smaller than the internal dimensions of said container so as to be capable, when unopposed, of substantially free movement forwardly toward the front of said container, a compression spring biasing said pressure plate forwardly, and fastener means releasably holding said pressure plate, in opposition to the bias of said biasing means, adjacent to a rear wall of said container, said fastener means comprising a projecting element and a socket engaging one another in the manner of a snap fastener, the socket passing through a wall of said container and enabling said pin member of the camera to enter it thus causing the ejection of said projecting element from said socket and permitting movement of said pressure plate forwardly in said container as urged by said compression spring.

References Cited by the Examiner
UNITED STATES PATENTS

| | | | |
|---|---|---|---|
| 300,478 | 6/1884 | Kayser | 95—20 |
| 744,498 | 11/1903 | Darlington | 95—20 |
| 2,447,468 | 8/1948 | Reyniers | 95—66 |

JOHN M. HORAN, *Primary Examiner.*